Jan. 29, 1963  F. W. DIESING  3,075,542
FLUID COOLED VALVE
Filed Jan. 28, 1959
FIG. I
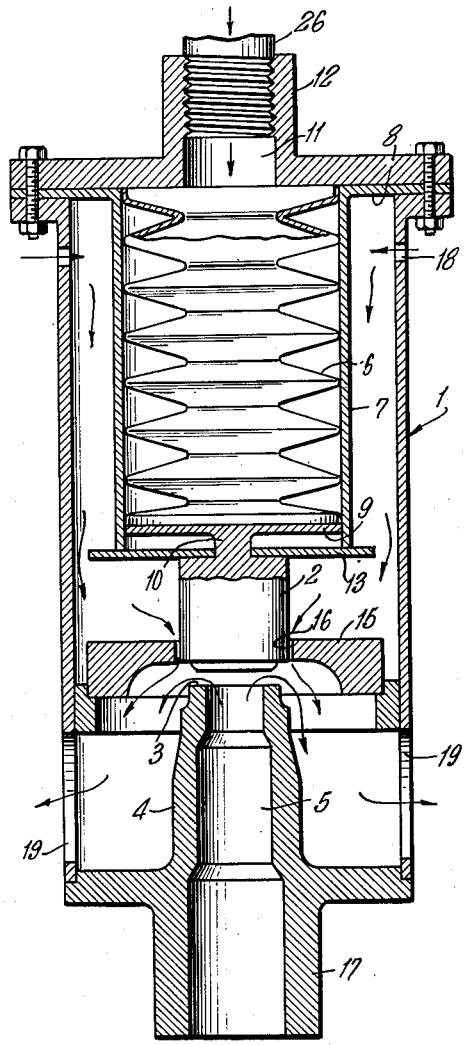
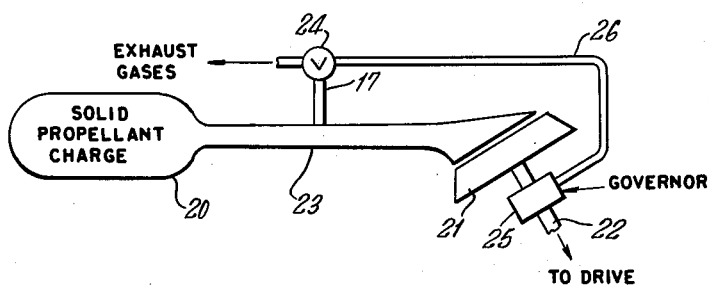
FIG. 2
INVENTOR.
Fred W. Diesing
BY
ATTORNEYS

United States Patent Office

3,075,542
Patented Jan. 29, 1963

3,075,542
FLUID COOLED VALVE
Fred W. Diesing, East Williston, N.Y., assignor to Fairchild Stratos Corporation, a corporation of Maryland
Filed Jan. 28, 1959, Ser. No. 789,717
5 Claims. (Cl. 137—338)

This invention relates to a valve assembly which regulates the flow of a fluid at high temperature and in which provision is made for cooling the valve by an induced flow of a fluid at lower temperature.

Valves which regulate the flow of fluids at high temperatures, for example, valves which control the bleed or discharge of combustion gases from a combustion chamber, are subject to failure by reason of the high temperature conditions within the valve assembly, especially the valve and valve seat. The present invention provides a novel assembly in which the flow of the high temperature fluid induces a flow of fluid at lower temperature through the valve assembly which induced flow brings the fluid at lower temperature into heat exchange relationship with the valve and valve seat. This induced circulation of the fluid at lower temperature reduces the temperature of the valve and valve seat and helps prevent failure of the valve assembly.

For a complete understanding of the present invention, reference may be made to the detailed description which follows and to the accompanying drawing in which:

FIGURE 1 is an elevational view showing the valve assembly of the present invention in cross section, FIGURE 2 is a schematic view of a system in which the valve might be employed.

Referring to FIGURE 1 of the drawing, the valve assembly of the present invention comprises generally a housing 1, a movable valve 2 accommodated within the housing, a valve seat 3 forming the upper end of an annular wall 4 defining a passage 5 therethrough, and a pressure controlled actuator 6 for regulating the position of the valve relative to the valve seat.

As shown, the pressure controlled actuator 6 is an expandable and collapsible bellows which, by its inherent resiliency, is normally urged to collapsed condition. The bellows 6 is accommodated within a cylindrical wall 7 which is open at both ends. The upper end of the cylindrical wall is provided with an outwardly projecting flange 8 by means of which the cylindrical wall is mounted to the upper wall of the housing. The upper end of the bellows in turn is fixedly connected to the upper end of the cylindrical wall.

The upper open end of the bellows communicates with a passage 11 which is defined by a neck portion 12 of the housing. The passage 11 connects the interior of the bellows with a source of variable control pressure by means of which the position of the valve 2 is regulated with respect to the valve seat 3.

The lower end of the bellows is closed and carries a movable disc 9 which is guided for movement within the cylindrical wall 7. The valve 2 is connected to this movable disc 9 by a valve stem 10. The valve stem 10 carries a shield 13 thereon immediately above the valve 2. The shield 13 serves to protect the actuator for the valve from damage by the high temperature of the fluid which flows through the valve. Being of larger dimensions than the lower end of the cylindrical wall 7, the shield 13 also serves as a stop to limit the upward movement of the valve 2 away from the valve seat 3. This maximum open position of the valve 2 is determined by the engagement of the upper surface of the shield 13 with the lower edge of the cylindrical wall 7.

The chamber defined within the valve housing 1 is divided into upper and lower portions by a wall 15. The wall 15 has an opening 16 therethrough which provides adequate clearance for the unobstructed movement of the valve 2 therein. It may be noted that the limits of movement of the valve 2 are such that a portion thereof is always interposed within the opening 16.

The extreme lower end of the housing 1 is provided with a downwardly depending neck portion 17 which has a passage therethrough forming the continuation of the passage 5. It is the flow through the passage 5 that is regulated by the position of the valve 2 relative to the valve seat 3. The position of the valve 2, in turn, is controlled by the pressure within the bellows 6. As the pressure within the bellows 6 increases, the bellows expands, moving the lower free end downwardly and moving the valve 2 closer to the valve seat 3. This, of course, reduces the rate of flow of the fluid through the passage therebetween. As the pressure within the bellows decreases, the bellows tends to contract, lifting the lower free end of the bellows, and thereby raising the valve away from its valve seat.

Air intake ports 18 are formed at the upper end of the housing 1. Also, a plurality of larger exhaust ports 19 are provided in the wall of the housing 1 below the wall 15. A flow of cool air is induced through the housing 1 by the flow of hot fluid from the passage 5 through open valve 2 to the discharge ports 19, the cool air serving to reduce the temperature of the valve assembly and prevent its failure.

This flow of cool air enters the upper portion of the housing through the ports 18, passes between the outer surface of the annular wall 7 and the inner surface of the housing, and through the restricted passage formed by the clearance between the valve 2 and the opening 16 into the lower portion of the housing and thence outwardly through the exhaust ports 19. The air thus circulated is brought into heat exchange relationship with the parts of the valve assembly, including the valve 2, the valve seat 3, and the outer surface of the wall 4 before being exhausted through the exhaust ports 19.

In one application of the valve assembly of the present invention, the valve is used as a bleed or bypass for combustion gases within a combustion chamber. For example, in the application schematically shown in FIGURE 2 of the drawing, combustion gases are relieved from the combustion chamber of a jet rocket engine in order to regulate the speed of operation of a turbine driven by the engine. In this system, a solid propellant fuel stored in the chamber 20 burns or decomposes, producing combustion gases which are exhausted through the conduit 23. These combustion gases serve as the impelling fluid used to drive the turbine wheel 21. The turbine wheel 21 is mounted on a shaft 22 through which other equipment may be driven. A bleed valve 24 of the type shown in FIGURE 1 is provided to control the energy transmitted by the engine to the turbine wheel 21. The bleed valve, in turn, is controlled by a governor 25 which produces a variable control pressure which corresponds to the speed of operation of the turbine wheel 21. The governor 25 may, for example, be of the type described in the copending application of James C. Greenlees, Serial No. 761,616, filed September 17, 1958.

In the event of overspeed operation of the shaft 22, a reduced pressure is transmitted through the conduit 26 to the actuator 6 of the valve 24. The actuator 6, in turn, responds to this reduced pressure by further opening the valve 2 to increase the rate of exhaust of the combustion gases through the passage 5 of the valve which is in communication with the exhaust conduit 23. These exhausted combustion gases flow upwardly through the valve 2 and the discharge ports 19, inducing a flow of air through the air intake ports 18 as described above so as to intermingle the cooler air with the hot combustion gases to cool the parts of the valve assembly. The hot combustion gases thus relieved from the exhaust conduit 23 through the valve 24 reduce the energy of the impelling fluid directed against the turbine wheel 21, thereby reducing the speed of the turbine wheel until a predetermined speed is reached at which a condition of equilibrium is established.

Similarly, in the event of an underspeed operation of the turbine, an increased pressure is transmitted through the conduit 26 regulating the valve to reduce the bleed of exhaust gases from the conduit 23 to speed up the turbine wheel until a condition of equilibrium is attained.

The invention has been shown in preferred form only and by way of example, and obviously many modificaitons and variations may be made therein without departing from the spirit of the invention. The invention, therefore, is not to be limited to any specified form or embodiment except insofar as such limitations are expressly set forth in the appended claims.

I claim:

1. A fluid cooled, high temeprature valve assembly comprising a housing, a partition within said housing dividing the interior of the housing into separate chambers, means defining a flow passage for a relatively hot fluid through one of the chambers of the housing, a valve seat dividing the flow passage into a passage upstream of the valve seat and a passage downstream of the valve seat, a valve cooperating with the valve seat to control the flow through the flow passage, a pressure controlled actuator accommodated within the other of said chambers, means defining an opening in the partition to accommodate a portion of said valve, the clearance between the opening and the valve defining a restricted passage therebetween, and means defining a port in the housing establishing communication between the chamber accommodating the pressure controlled actuator and a source of cooling fluid, the flow of fluid through the valve inducing a flow of the cooling fluid from one chamber to the other chamber through the restricted passage to cool the valve.

2. A fluid cooled, high temperature valve assembly as set forth in claim 1 including a shield within the chamber accommodating the pressure controlled actuator and carried by the valve.

3. A fluid cooled, high temperature valve assembly as set forth in claim 1 in which the pressure controlled actuator is an expandable and contractable bellows.

4. A fluid cooled, high temperature valve assembly comprising a housing, a partition separating the interior of the housing into different chambers, means defining a flow passage for a relatively hot fluid through one of the chambers of the housing, a valve seat dividing the flow passage into a passage upstream of the valve seat and a passage downstream of the valve seat, a valve cooperating with the valve seat to control the flow through the flow passage, means defining an inlet port in the other chamber of said housing establishing communication between a cooling fluid and the downstream passage, and means defining an opening in said partition connecting the said chambers, at least a portion of the valve being accommodated within said opening through the partition so as to define a restricted passage, whereby the flow of the relatively hot fluid through the flow passage induces a flow of the cooling fluid into that chamber from the other chamber through the restricted passage to cool the valve.

5. A fluid cooled, high temperature valve assembly as set forth in claim 4 including a pressure controlled actuator in the chamber in communication with the cooling fluid, a protective shield having an open end surrounding the pressure controlled actuator, the outer periphery of the shield and the inner surface of the housing defining a passage therebetween for the flow of the cooling fluid, and another shield carried by the valve intermediate the partition and the open end of the said first-mentioned shield to protect the pressure controlled actuator.

References Cited in the file of this patent

UNITED STATES PATENTS

| | | |
|---|---|---|
| 1,236,216 | Schuler | Aug. 7, 1917 |
| 1,376,060 | Winton | Apr. 26, 1921 |
| 1,394,665 | Bruneau | Oct. 25, 1921 |
| 1,726,217 | Friedl | Aug. 27, 1929 |
| 1,987,883 | White | Jan. 15, 1935 |
| 2,270,546 | Neuland | Jan. 20, 1942 |
| 2,401,883 | Pugh | June 11, 1946 |